United States Patent [19]

Balaban

[11] 3,878,336

[45] Apr. 15, 1975

[54] DIGITAL SYNCHRONIZING SYSTEM

[75] Inventor: Alvin Reuben Balaban, Raritan, N.J.

[73] Assignee: RCA Corporation, New York, N.Y.

[22] Filed: Oct. 18, 1973

[21] Appl. No.: 407,700

[52] U.S. Cl. ............................ 178/69.5 TV; 328/63

[51] Int. Cl. ............................ H04m 5/06

[58] Field of Search..... 178/69.5 TV, 69.5 R, 7.3 R, 178/7.3 S, 7.5 R, 7.5 S; 179/15 BS; 328/63

[56] References Cited

UNITED STATES PATENTS

| | | | |
|---|---|---|---|
| 3,311,701 | 3/1967 | Lynch | 178/69.5 TV |
| 3,530,238 | 9/1970 | Mataresc | 178/69.5 TV |
| 3,688,037 | 8/1972 | Ipri | 178/69.5 TV |
| 3,691,297 | 9/1972 | Merrell et al. | 328/63 |
| 3,751,588 | 8/1973 | Eckenbrecht et al. | 178/69.5 TV |

*Primary Examiner*—Charles E. Atkinson
*Assistant Examiner*—Errol A. Krass
*Attorney, Agent, or Firm*—Eugene M. Whitacre; Paul J. Rasmussen

[57] ABSTRACT

Frequency doubled television receiver horizontal deflection frequency signals are divided in a divide-by-525 counter to produce pulses at the vertical deflection rate. The five hundred twentieth pulse of each 525 pulse series is used to enable a bistable multivibrator which produces an enabling signal on an "and" gate. The five hundred twenty-fifth pulse of each 525 pulse series produces a resetting signal on an "or" gate. The fifth pulse of each 525 pulse series removes the enabling signal from the output terminal of the bistable multivibrator thereby inhibiting the and gate. The vertical sync pulse appearing between the five hundred twentieth pulse of each 525 pulse series and the fifth pulse of the next succeeding 525 pulse series passes through the enabled and gate and synchronizes the operation of the vertical deflection circuit. The vertical deflection sync pulse is also coupled to the or gate to reset the divide-by-525 counter and synchronize its operation to the incoming vertical sync.

13 Claims, 4 Drawing Figures

DIGITAL SYNCHRONIZING SYSTEM

BACKGROUND OF THE INVENTION

This invention relates to television receivers and particularly to an improved television receiver deflection synchronization system.

A common problem in the operation of television receiver vertical and horizontal deflection synchronization circuitry is degradation of the received sync signal by external noise, interference, airplane "flutter" and other spurious signals. Degradation generated outside the television signal transmission system can get into the vertical and horizontal sync signals and can result in inability of the receiver to produce a viewable display.

The problem of degradation is critical in the vertical and horizontal sync information signals since the vertical and horizontal sync signals are both pulses which can be duplicated by many types of spurious signals. The vertical sync pulse is perhaps more easily duplicated by sources of spurious external signals since the vertical pulse is a considerably wider, lower frequency pulse. Spurious signals which trigger the vertical deflection generator circuit of a television receiver result in flicker or jitter of the kinescope display, or in severe cases in which the spurious signal is recurring at a steady rate, the interference may result in annoying roll of the kinescope display.

It would be desirable to achieve greater immunity from spurious signal triggering of the vertical deflection generator than is available with existing vertical deflection sync systems by utilizing the knowledge of when succeeding vertical sync pulses will occur to prepare the vertical sync circuitry for the arrival of succeeding vertical sync pulses.

In situations in which two signals occur in a particular time relationship to each other and the first of these signals is of substantially lower frequency than the second, as is the case with television vertical and horizontal deflection sync pulses, it may be desirable to use the second signal to derive the first signal either directly or indirectly. In such an arrangement, use can be made of the knowledge of the frequency relationship of the two signals and the time at which the first signal last appeared. For example, occurrences of the second signal can be counted from the time at which the first signal last appeared and upon the occurrence of a particular count, the second signal could enable the circuitry which receives the first signal.

In the television system employed in the United States in which there are two vertical sync pulses for every 525 horizontal sync pulses, the vertical frequency is approximately 60 Hertz and the vertical sync pulse is approximately 3 horizontal sync pulse periods in length. So if, for example, pulses were allowed to be passed from the sync separator to the vertical deflection generator only during the period in which the vertical sync pulse is anticipated, spurious signals occurring between the arrival of one vertical sync pulse and the time at which the next vertical sync pulse is expected to arrive could not trigger the vertical deflection generator. Such an arrangement would eliminate jitter or roll of the kinescope display, both common problems where disturbances which occur in the vertical sync are allowed to pass into and trigger the vertical deflection generator.

SUMMARY OF THE INVENTION

In accordance with the present invention, a synchronizing system includes a first source of synchronizing pulses which is subject to degradation and a second source of synchronizing pulses for providing pulses at some constant multiple of the frequency of occurrence of pulses from the first source. Resettable counting means are provided for counting the constant multiple of pulses provided by the second source of synchronizing pulses and for producing signals representative of the counting of first and second numbers of pulses from the second source of synchronizing pulses. Resetting means are also provided and are coupled to the resettable counting means and to the first source of synchronizing pulses for resetting the resettable counting means when either the second number of pulses is counted by the resettable counting means or a pulse is supplied by the first source of synchronizing pulses. Enabling means are coupled to the resettable counting means for producing at an output terminal of the enabling means an enabling signal which is initiated by the counting of the first number of pulses by the resettable counting means. Coincidence gating means coupled to both the enabling means and to the first source of synchronizing pulses allow pulses from the first source of synchronizing pulses to pass through the synchronizing system during the incidence of the enabling signal.

The invention will best be understood by reference to the following description and accompanying drawings of which:

DESCRIPTION OF THE PREFERRED EMBODIMENT

Figure 1:
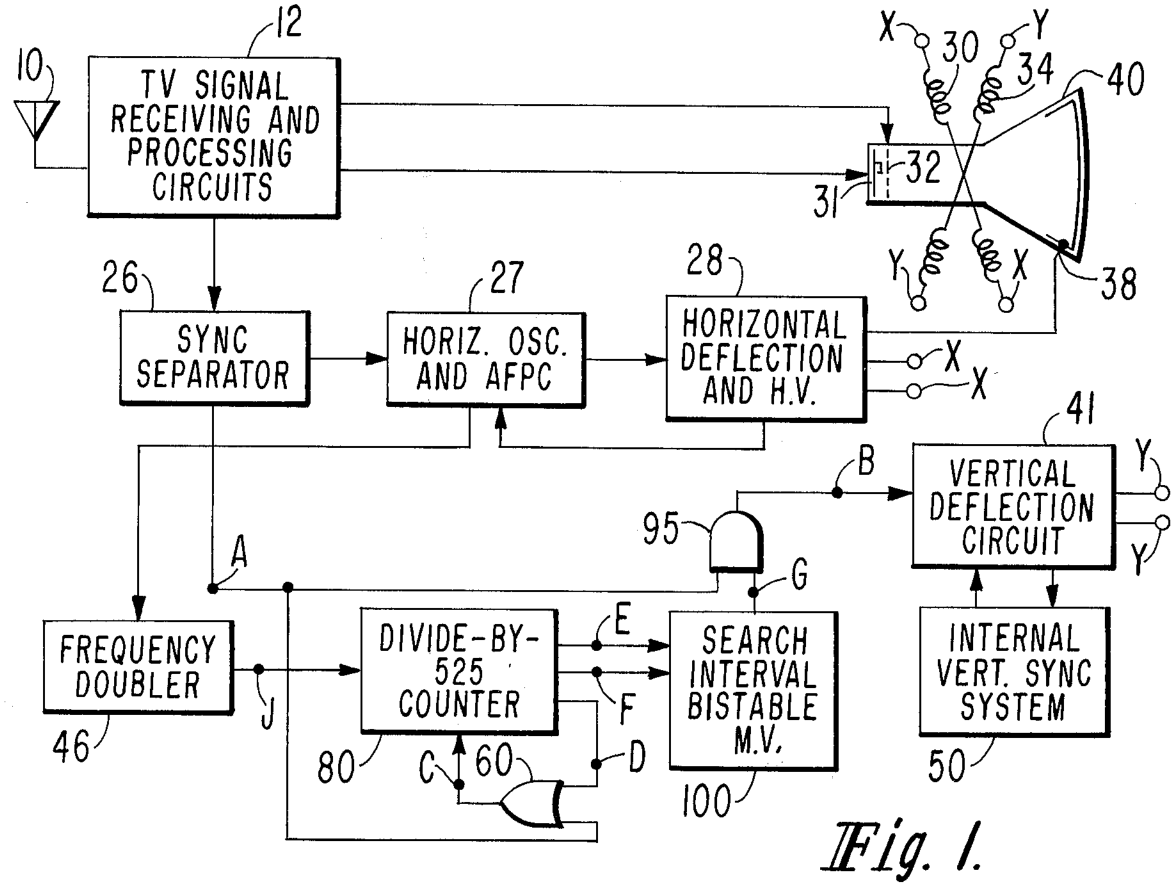
FIG. 1 is a block diagram of an embodiment of the present invention in a television receiver.

In an embodiment of the invention illustrated in FIG. 1, an antenna 10 couples received video, audio and deflection synchronization information to a complement of television signal receiving and processing circuits 12 including a tuner and R.F. amplifier, I.F. amplifier, audio detecting and amplifying circuits and a speaker, video detectors, a video amplifier and in color television receivers, chrominance and color reference circuitry. All of the circuits represented by block 12 may be conventional circuits known in the art. Television signal receiving and processing circuit 12 is coupled to kinescope 40 through a cathode 31 and through a control grid 32.

Circuit 12 also supplies information to a sync separator 26 which extracts from this information the vertical and horizontal sync pulses.

Horizontal sync information is supplied to the horizontal oscillator and AFPC circuit 27 to which sync separator 26 is coupled. Horizontal oscillator and AFPC circuit 27 is coupled to a horizontal deflection and high voltage circuit 28. A high voltage circuit in circuit 28 is connected to kinescope 40 and provides accelerating potential to a final anode 38 of kinescope 40.

A horizontal deflection amplifier in circuit 28 supplies horizontal deflection current to horizontal deflection windings 30 through terminals X—X. A signal representative of the horizontal retrace pulse is fed back to horizontal oscillator and AFPC circuit 27 from horizontal amplifier and high voltage circuit 28 to automatically control the horizontal oscillator frequency.

The vertical deflection sync pulse obtained from sync separator 26 is coupled to input terminals of an or gate 60 and an and gate 95. Circuits 10 through 41 operate in accordance with known principles.

The horizontal deflection sync pulse is coupled from horizontal oscillator and AFPC circuit 27 to a frequency doubler 46. An output terminal of frequency doubler 46 is coupled to a divide-by-525 counter 80.

The divided output of divide-by-525 counter 80 is coupled to a second input terminal of or gate 60. The output terminal of gate 60 is coupled through terminal C to a reset input terminal of divide-by-525 counter 80. Thus the occurrence of either the five hundred twenty-fifth count by counter 80 or the vertical sync pulse or both causes counter 80 to be reset.

Another output terminal of divide-by-525 counter 80 representing the five hundred twentieth pulse of each 525 pulse series counted by counter 80 is coupled to a first input terminal of a search interval bistable multivibrator 100. An output terminal of divide-by-525 counter 80 representing the fifth pulse of each 525 pulse series is coupled to a second input terminal of multivibrator 100. An output terminal of multivibrator 100 is coupled to a second input terminal of and gate 95 through terminal G.

The output terminal of and gate 95 is coupled to a vertical deflection circuit 41 through terminal B. A pair of vertical deflection windings 34 are coupled across output terminals Y—Y of vertical deflection circuit 41. Windings 34 carry the vertical deflection current. Feedback is provided from vertical deflection circuit 41 to an overscan protection circuit 50 and an output terminal of circuit 50 is coupled back to vertical deflection circuit 41.

The horizontal oscillator in horizontal oscillator and AFPC circuit 27 operates at approximately 15.75 Kilohertz. Since signals from the horizontal oscillator are passed through frequency doubler 46 before being fed to divide-by-525 counter 80, it can be seen that the output signal of divide-by-525 counter 80 will be a pulse with a frequency of approximately 60 Hertz, the vertical sync pulse frequency.

The counting of the five hundred twentieth pulse of a 525 pulse series in divide-by-525 counter 80 causes terminal E to be energized to a logic "1" condition. This condition in turn sets the output terminal G of search interval bistable multivibrator 100 to a logic 1 condition and prepares and gate 95 for the passage of the vertical sync pulse to terminal B, the input terminal of the vertical deflection circuit 41.

The counting of the five hundred twenty-fifth pulse in divide-by-525 counter 80 at terminal D or the occurrence of a vertical sync pulse at terminal A serves to reset divide-by-525 counter 80 by placing a logic 1 condition at terminal C.

And gate 95, which was enabled by the previously described action of search interval bistable multivibrator 100 upon the occurrence of the five hundred twentieth pulse of a 525 pulse series, passes the vertical sync pulse to terminal B where the pulse synchronizes the vertical deflection circuit.

Figure 2:
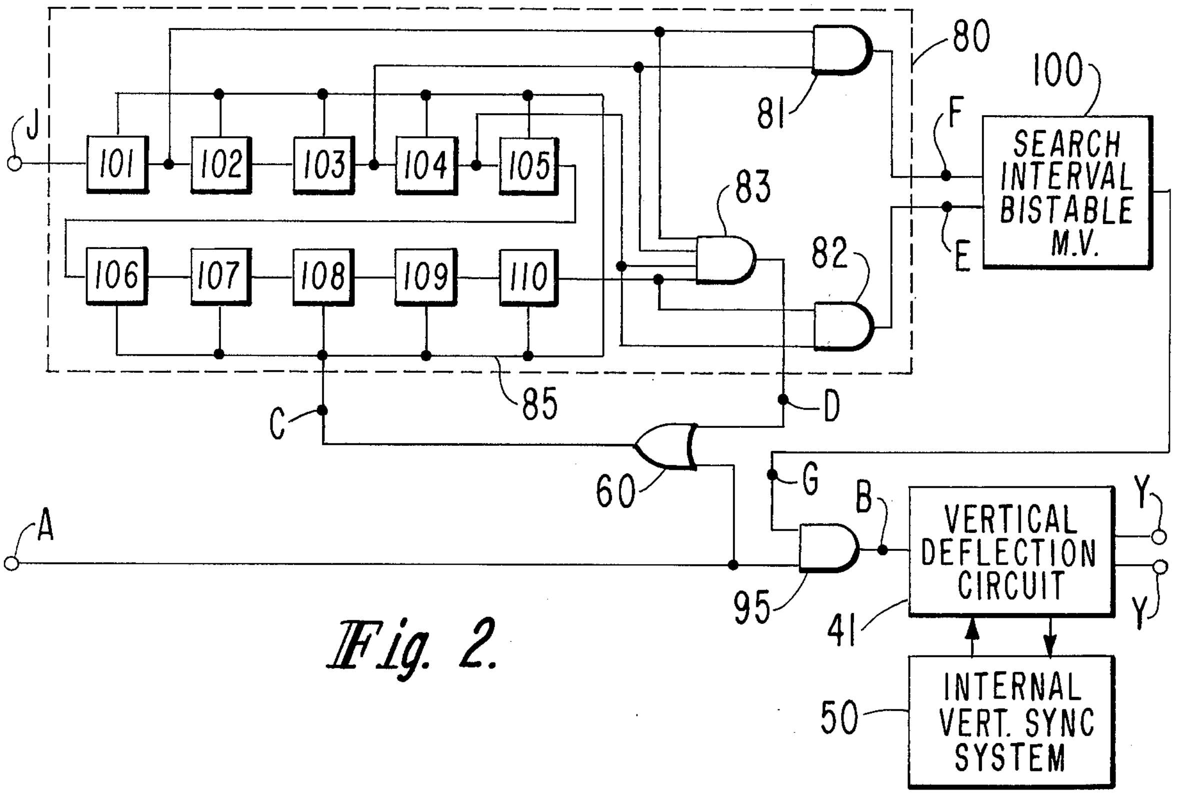
FIG. 2 is a more detailed block diagram of the vertical deflection synchronizing system portion of the receiver illustrated in FIG. 1.

In the embodiment illustrated in FIGS. 1 and 2 search interval multivibrator 100 produces an enabling pulse for gate 95 for a somewhat longer period of time than the occurrence of vertical sync at terminal A by allowing and gate 95 to remain in an enabled state until divide-by-525 counter 80 has counted five pulses of the next 525 pulse series following the occurrence of the reset pulse on terminal C. In other applications of the system it may be desirable to produce a shorter or longer search interval. This may be achieved by choosing proper output pulses from divide-by-525 counter 80 for terminals E and F or by using a monostable multivibrator in place of bistable 100 and triggering it at the beginning of the desired search interval to produce the desired length search interval. In this manner the system can control the amount of the signal introduced at terminal A which reaches terminal B.

Upon the occurrence of the fifth pulse of the next succeeding series of clock pulses obtained from frequency doubler 46, ten clock pulses after the enabling pulse has appeared on terminal G, the entire vertical sync pulse will have been allowed to pass through and gate 95. A logic 1 then appears on terminal F of search interval multivibrator 100 to disable gate 95 by removing the logic 1 condition at terminal G. And gate 95 is thereby disabled and no signal will be allowed to pass from terminal A to terminal B until the counting by divide-by-525 counter 80 of 520 pulses of the next succeeding 525 pulse series corresponding to a time shortly before the occurrence of the next expected vertical sync pulse at terminal A. At that time a logic 1 will again appear at terminal E of multivibrator 100 which in turn enables gate 95.

It can be seen that noise pulses occurring at terminal A between vertical sync pulses will not be passed to terminal B through disabled and gate 95 and will, therefore, not cause spurious triggering of the vertical deflection generating circuitry and the jitter or roll which may result therefrom will thus be eliminated.

It may also be seen that divide-by-525 circuit 80 may be reset by noise pulses occurring between vertical sync pulses at terminal A. Such noise resetting would result in an out-of-sync condition in vertical deflection circuit 41 as a result of failure of counter 80 to provide a signal at terminal E to enable gate 95 to pass the next vertical sync pulse from terminal A to terminal B.

To correct for noise resetting, internal vertical sync system 50 generates a pulse which provides for proper operation of vertical sync circuit 41 until sync can be regained through and gate 95 by normal operation of the system.

FIG. 2 illustrates one scheme for constructing divide-by-525 counter 80 in order to perform the divide-by-525 function at point D and to produce the enabling pulse for and gate 95 by producing pulses at terminals E and F of search interval multivibrator 100 respectively shortly before and after the anticipated arrival of the vertical sync pulse at terminal A. All points and elements lettered and numbered as in FIG. 1 perform the same functions.

Clock pulses occurring at terminal J are coupled to a first flip-flop 101 of ten serially coupled flip-flops 101 through 110 in divide-by-525 counter 80. The output terminal of each of the first nine flip-flops 101 through 109 is coupled to the input terminal of the following flip-flop. The reset terminals of all ten of the flip-flops are connected to a single resetting line 85 which is coupled to resetting terminal C, the output terminal of or gate 60.

The output terminals of flip-flops 104 and 110 are connected to the input terminals of an and gate 82, the output terminal of which is connected to terminal E. The output terminals of flip-flops 101 and 103 are connected to the input terminals of an and gate 81, the output terminal of which is connected to terminal F. The output terminals of flip-flops 101, 103, 104, and 110 are also connected to the input terminals of an and gate 83, the output terminal of which is connected to terminal D, an input terminal of or gate 60.

Logic 1 conditions occurring on the output terminals of flip-flops 104 and 110 correspond to the binary number 1000001000, the binary representation of the decimal number 520. The occurrence of the five hundred twentieth pulse of a 525 pulse series causes and gate 82 to be enabled and pass an enabling pulse to terminal E which, in turn causes a search interval pulse to occur at point G, the input terminal of and gate 95. A vertical sync pulse occurring at terminal A during this search interval pulse will pass directly to point B, the input terminal of vertical deflection circuit 41.

The occurrence of logic 1 levels on the output terminals of flip-flops 101, 103, 104, and 110 corresponds to the binary number 1000001101 which is the binary representation of the divisor 525. The coincidence of these logic 1 conditions causes a logic 1 to appear on the output terminal D of and gate 83 causing or gate 60 to pass a reset pulse to all of the flip-flops 101 through 110 through terminal C and reset line 85.

The occurrence of logic 1 conditions on the output terminals of flip-flops 101 and 103 corresponds to the binary number 0000000101 which is the binary representation of the decimal number 5. The coincidence of these logic 1 conditions causes a logic 1 to appear on the output terminal of and gate 81. The occurrence of a logic 1 condition on this terminal marks the close of the search interval by bringing point G to logic level 0 and disabling and gate 95 so that no pulses will be passed through gate 95 to terminal B until the beginning of the next search interval i.e., the counting of 520 pulses of the next 525 pulse series.

Thus, it can be seen that during the interval between the disabling of search interval gate 100 by the occurrence of a logic 1 condition on terminal F and the enabling of gate 100 by the occurrence of a logic 1 condition on terminal E, signals will not pass through the system from terminal A to terminal B.

Figure 3:
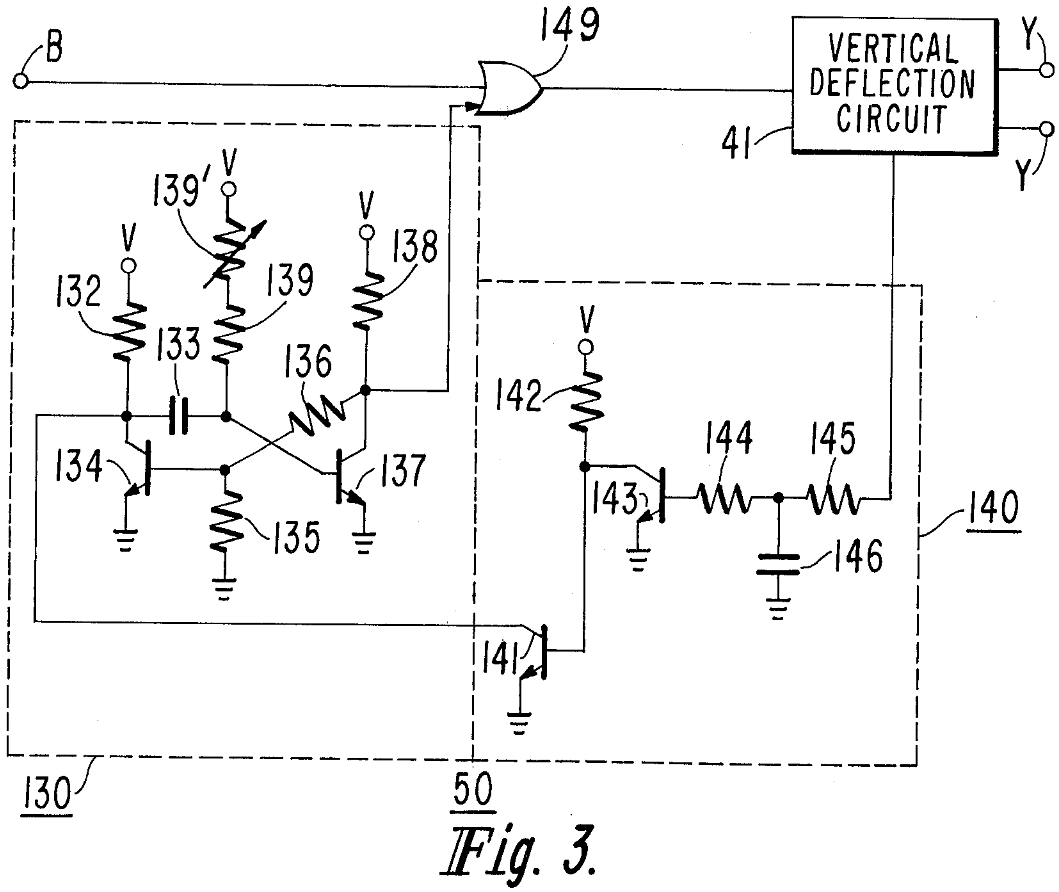
FIG. 3 is a partly schematic and partly block diagram of an embodiment of a portion of the vertical deflection synchronization system illustrated in FIGS. 1 and 2.

FIG. 3 illustrates a first embodiment of internal vertical sync system 50 of FIGS. 1 and 2. This circuit generates vertical sync in the absence of sync at terminal B. The construction and operation of such a system is described in detail in my copending United States patent application, Ser. No. 407,696, filed Oct. 18, 1973, entitled "Digital Synchronization System" and assigned to the same assignee as the present invention but will be briefly described here to aid in understanding its operation in the present system.

Voltage representative of the vertical sawtooth current waveform in vertical deflection yoke 34 of FIG. 1 is coupled to a noise immunity circuit comprising a resistor 145 and a capacitor 146 in series to ground. From their junction, a base protection resistor 144 couples signals to the base of a transistor 143. The emitter of transistor 143 is grounded and its collector is connected through a resistor 142 to a direct current voltage supply V.

The collector of transistor 143 is also coupled to the base of a transistor 141. The emitter of transistor 141 is grounded and its collector forms the output terminal of an overscan threshold sensing circuit 140 comprising elements 141 through 146.

This output terminal of sensing circuit 140 is connected to an input terminal of a pulse shaping monostable multivibrator circuit 130. The input terminal of multivibrator 130 is the junction of a resistor 132, the collector of a transistor 134, and a capacitor 133. The remaining terminal of resistor 132 is connected to direct current voltage supply V and the remaining terminal of capacitor 133 is coupled through the series combination of a resistor 139 and a potentiometer 139' to voltage supply V.

The emitter of transistor 134 is grounded and its base is coupled through a resistor 135 to ground and through a series combination of a resistor 136 and a resistor 138 to voltage supply V. The junction of resistors 136 and 138 is coupled to the collector of a transistor 137, the emitter of which is grounded. The base of transistor 137 is coupled to the junction of capacitor 133 and resistor 139. The collector of transistor 137 forms the output terminal of monostable multivibrator 130 and is coupled to one input terminal of an or gate 149, another input terminal of which is coupled to terminal B. The output terminal of or gate 149 is coupled to the input terminal of vertical deflection circuit 41. Or gate 149 is added to provide isolation between the output terminal of monostable multivibrator 130 and the output terminal of and gate 95 at terminal B.

When vertical sync is absent at terminal B the sawtooth voltage feedback from vertical deflection circuit 41 falls below some threshold value turning off transistor 143. Transistor 141 is driven into saturation triggering monostable multivibrator 130 which produces a positive pulse at terminal B and initiates the next vertical deflection cycle.

Figure 4:
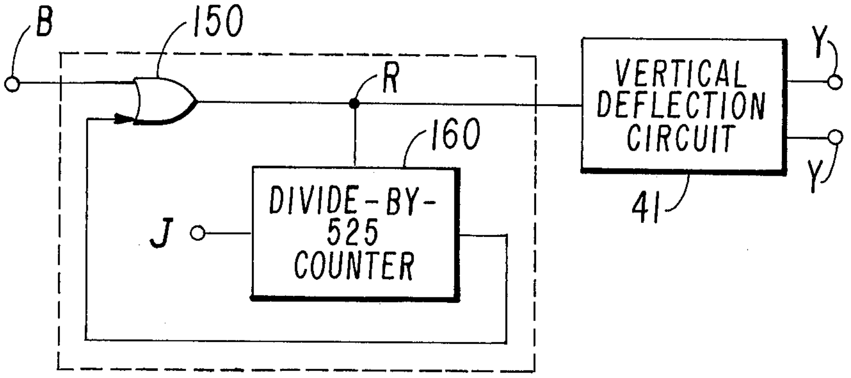
FIG. 4 is a block diagram of a second embodiment of a portion of the vertical deflection synchronization system illustrated in FIGS. 1 and 2.

FIG. 4 is a block diagram illustrating another embodiment of internal vertical sync system 50.

Terminal B is coupled to one input terminal of an or gate 150. The output terminal of or gate 150 is coupled to the reset line of a divide-by-525 counter 160 and to the input terminal of vertical deflection circuit 41. The five hundred twenty-fifth count output terminal of counter 160 is coupled to a second input terminal of or gate 150. Clock pulses are provided to divide-by-525 counter 160 from terminal J, the source of clock pulses discussed in connection with FIGS. 1 and 2.

Should external sync be absent at terminal B, the divided clock output of divide-by-525 counter 160, which passes through or gate 150 to reset counter 160, also provides the sync pulse to trigger the next vertical deflection cycle of vertical deflection circuit 41. It should be noted that in a manner similar to that discussed in connection with FIGS. 1 and 2, if the internally generated reset pulse generated by counter 160 is not of sufficient duration or is of too long duration to properly sync the vertical deflection circuit 41, a monostable multivibrator or other suitable circuit can be saturated between point R, the output terminal of or gate 150 to the reset line of counter 160, and the input terminal of vertical deflection circuit 41 to provide a pulse of sufficient duration to properly sync vertical deflection circuit 41.

What is claimed is:

1. A synchronizing system comprising:

a first source of synchronizing pulses subject to degradation;

a second source of synchronizing pulses for providing pulses in a particular multiple of the frequency of occurrence of pulses from said first source of pulses;

resettable counting means coupled to said second source of synchronizing pulses for counting said multiple of synchronizing pulses provided by said second source of synchronizing pulses and for producing signals representative of counting first, second and third number of pulses from said second source of synchronizing pulses;

resetting means coupled to said resettable counting means and to said first source of synchronizing pulses for resetting said resettable counting means upon the occurrence of said second number of pulses from said second source of synchronizing pulses or upon the occurrence of a pulse from said first source of synchronizing pulses;

enabling means coupled to said resettable counting means for producing an enabling signal during the interval between said first number and said third number of pulses of said resettable counting means; and coincidence gating means coupled to said enabling means and to said first source of synchronizing pulses for allowing pulses from said first source of synchronizing pulses to pass through said synchronizing system during the incidence of said enabling signal.

2. A synchronizing system according to claim 1 wherein:

said resetting means is an or gate.

3. A synchronizing system according to claim 1 wherein:

said enabling means is a flip-flop.

4. A synchronizing system according to claim 1 wherein:

said enabling means is a monostable multivibrator.

5. A synchronizing system according to claim 1 wherein:

said resettable counting means comprises a plurality of serially coupled flip-flops having common reset lines for being reset simultaneously when energized from said resetting means and having output terminals of flip-flops representing said first and second numbers of pulses coupled to input terminals of coincidence gates for passing through said coincidence gates pulses representative of the counting of said first and second numbers of pulses.

6. In a television receiver, a digital deflection synchronizing system comprising:

a deflection circuit for producing deflection scanning current;

a deflection winding coupled to said deflection circuit for receiving scanning current therefrom;

a source of clock synchronizing pulses;

a source of deflection rate synchronizing pulses;

resettable counting means coupled to said source of clock synchronizing pulses for counting said clock synchronizing pulses and for producing signals representative of counting first, second and third numbers of pulses from said source of clock synchronizing pulses;

resetting means coupled to said resettable counting means and to said source of deflection rate synchronizing pulses for resetting said resettable counting means upon the occurrence of said second number of pulses from said source of clock synchronizing pulses or pulses from said source of deflection rate synchronizing pulses;

enabling means coupled to said resettable counting means for producing an enabling signal during a time interval between said first and third number of pulses; and coincidence gating means coupled to said enabling means, to said source of deflection rate synchronizing pulses and to said deflection circuit for allowing pulses from said source of deflection rate synchronizing pulses to pass through said deflection synchronizing system and to synchronize said deflection circuit during said time interval thereby making said deflection circuit immune from being controlled by pulses occurring in said source of deflection rate synchronizing pulses at any time other than during said time interval after the occurrence of said first number of pulses.

7. A digital deflection synchronizing system according to claim 6 wherein:

said source of clock synchronizing pulses is a frequency doubler coupled between a television receiver horizontal oscillator and said resettable counting means for doubling the frequency of pulses produced in said horizontal oscillator and for passing pulses at twice the horizontal oscillator frequency to said resettable counting means to be counted.

8. A digital deflection synchronizing system according to claim 6 wherein:

said resettable counting means comprises a plurality of serially coupled flip-flops having common reset lines for being reset simultaneously when energized from said resetting means and having output terminals of flip-flops representing said first and second numbers of pulses coupled to input terminals of coincidence gates for passing through said coincidence gates pulses representative of the counting of said first and second numbers of pulses.

9. A digital deflection synchronizing system according to claim 6 wherein:

said resetting means is an or gate.

10. A digital deflection synchronizing system according to claim 6 wherein:

said enabling means is a flip-flop.

11. A digital deflection synchronizing system according to claim 6 wherein:

said enabling means is a monostable multivibrator.

12. A digital deflection system according to claim 6 wherein:

an internal vertical synchronization system comprising an or gate and a second resettable counting means, said second resettable counting means being coupled to said source of clock synchronizing pulses for counting said clock synchronizing pulses and for producing at an output terminal a signal representative of counting said second number of pulses from said source of clock synchronizing pulses;

said output terminal of said resettable counting means being coupled to an input terminal of said or gate and an input terminal of said coincidence gating means being coupled to a second input terminal of said or gate; and said or gate having an output terminal coupled to a resetting terminal of said second resettable counting means and to said deflection circuit for allowing pulses from said source of deflection synchronizing pulses which pass through said coincidence gating means to reset said second resettable counting means and synchronize said deflection circuit and for allowing pulses from said second resettable counting means to reset said second resettable counting means and synchronize said deflection circuit in the absence of said deflection synchronizing pulses.

13. A synchronizing system comprising:

a first source of synchronizing pulses subject to degradation;

a second source of synchronizing pulses occurring at a multiple of the frequency of said pulses from said first source;

resettable counting means coupled to said second source for producing first, second and third signals upon counting first, second and third numbers of pulses respectively from said second source;

enabling means coupled to said resettable counting means and to said first source of synchronizing pulses for being enabled by said first signal from said resettable counting means for passing pulses from said first source occurring during a predetermined time interval after said first signal enables said enabling means and for being disabled by the occurrence of said third signal marking the end of said predetermined time interval; and means coupled to said resettable counting means and to said first source of synchronizing pulses for resetting said resettable counting means upon the occurrence of said second number of pulses from said resettable counting means or upon the occurrence of a pulse from said first source of synchronizing pulses.

* * * * *